May 31, 1966  W. N. BROWN ET AL  3,253,792
STATOR WINDING MACHINE AND TOOLING THEREFOR
Filed April 19, 1963  6 Sheets-Sheet 1

Inventors:
William N. Brown,
John J. Henry,
by Hood, Gust & Irish
Attorneys.

May 31, 1966  W. N. BROWN ET AL  3,253,792
STATOR WINDING MACHINE AND TOOLING THEREFOR
Filed April 19, 1963  6 Sheets-Sheet 2

Inventors:
William N. Brown,
John J. Henry,
by Hood, Gust & Irish
Attorneys.

May 31, 1966   W. N. BROWN ET AL   3,253,792
STATOR WINDING MACHINE AND TOOLING THEREFOR
Filed April 19, 1963   6 Sheets-Sheet 3
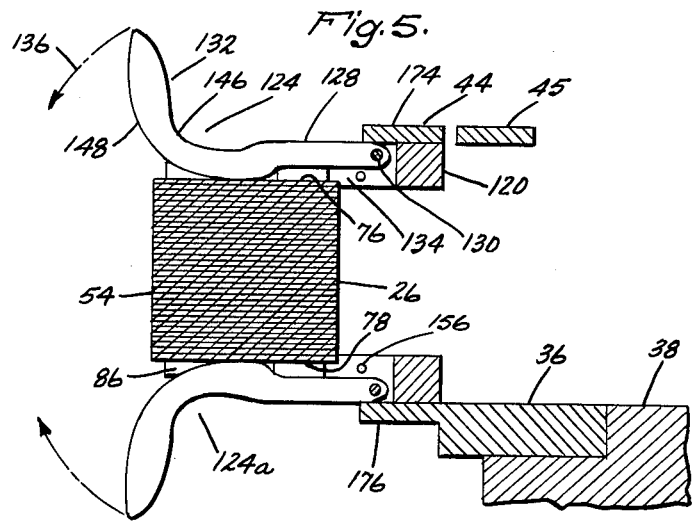
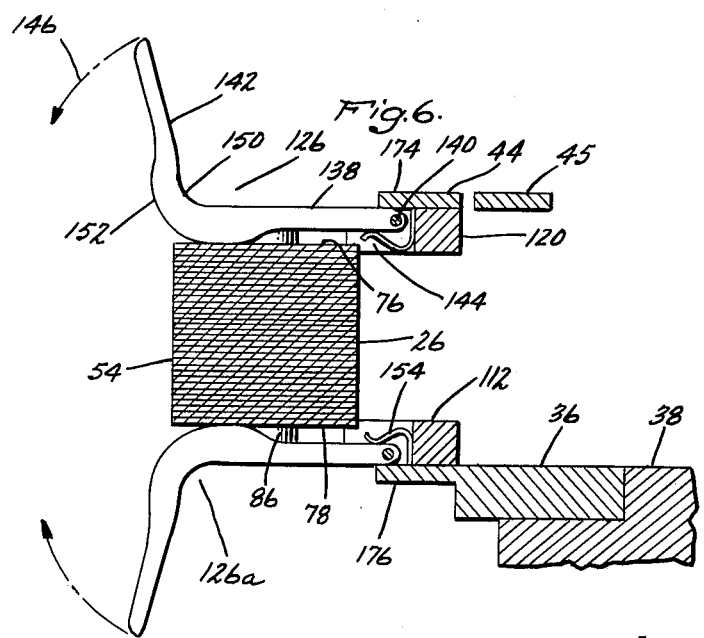
Inventors:
William N. Brown,
John J. Henry,
by Hood, Gust & Irish
Attorneys.

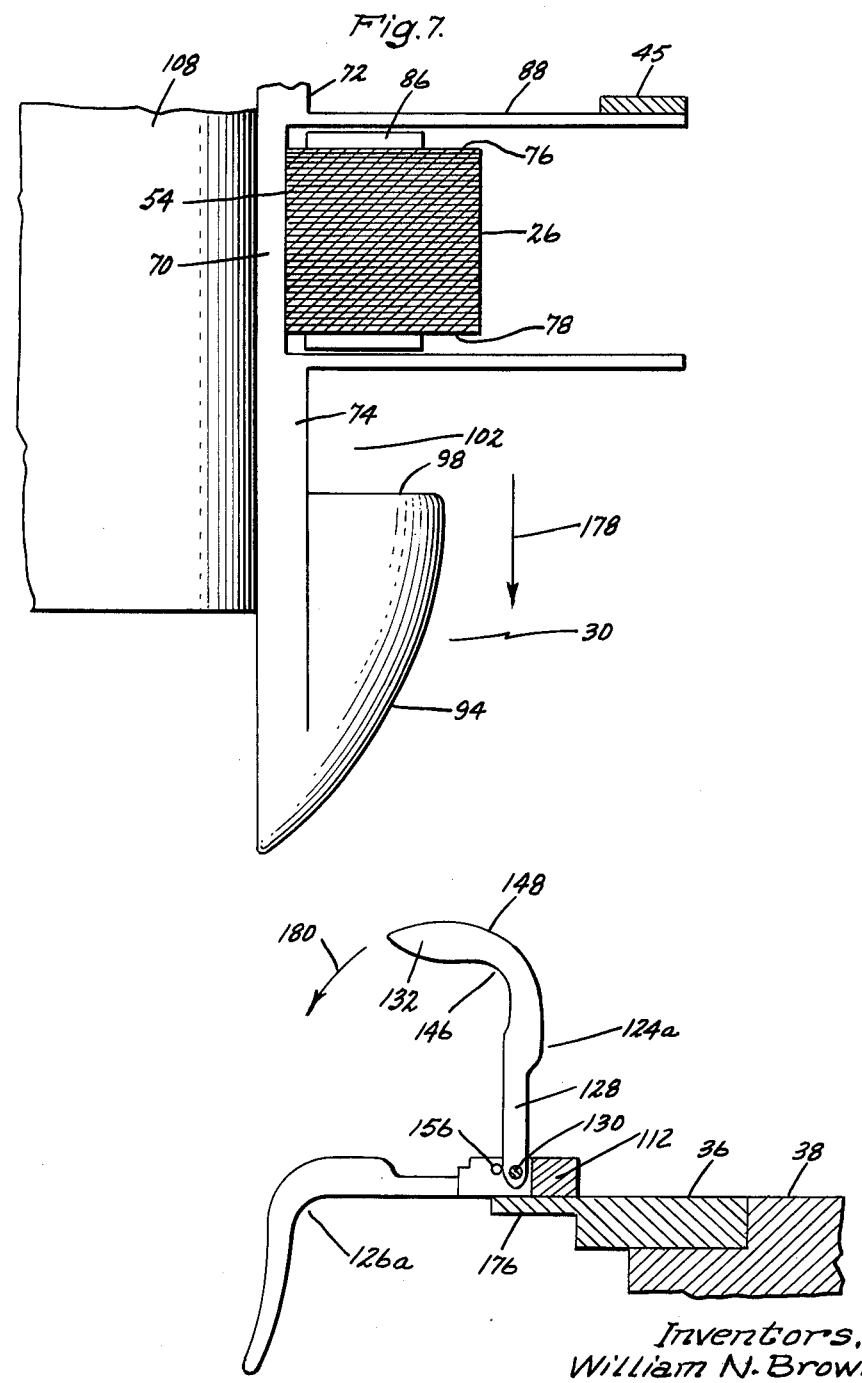

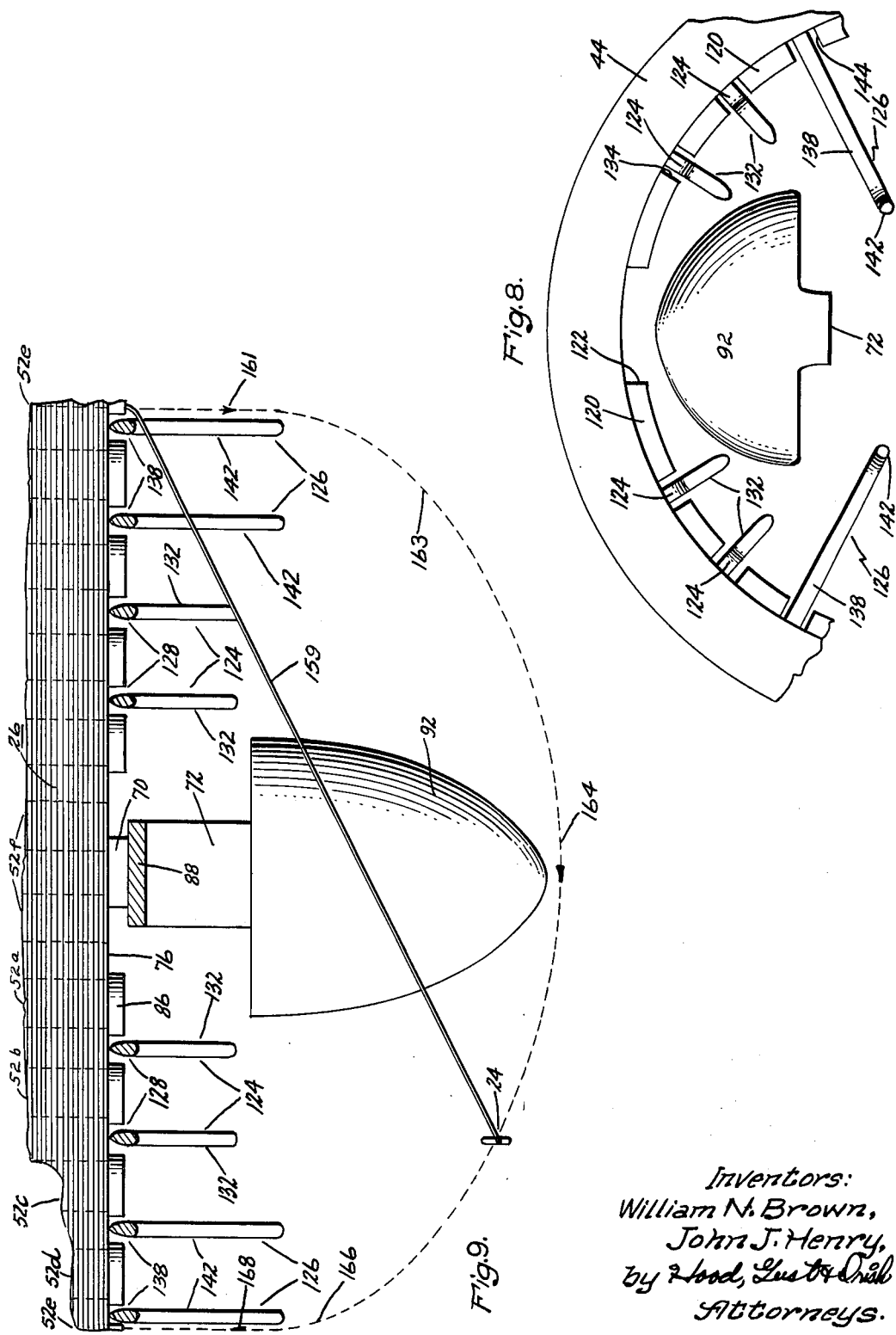

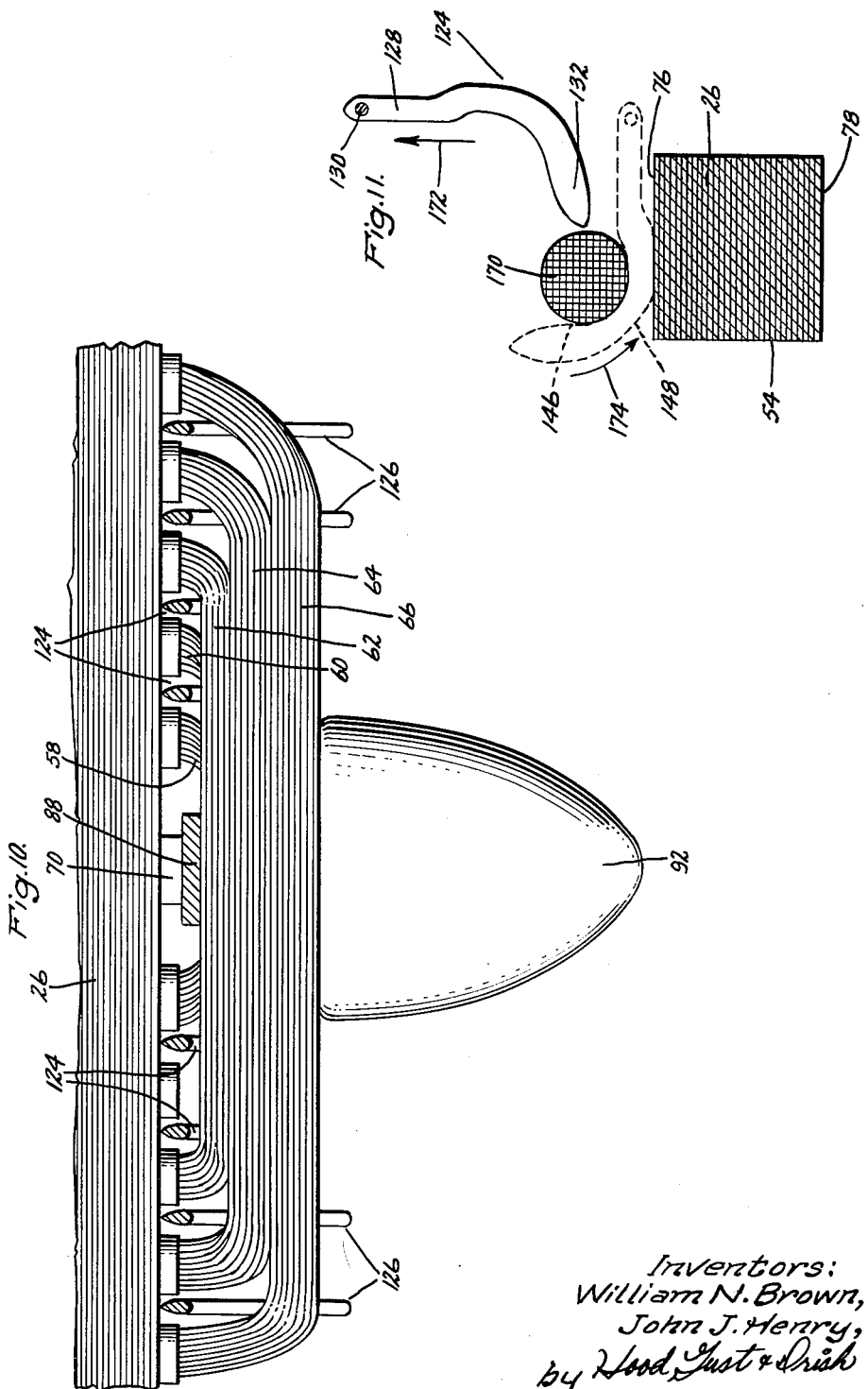

United States Patent Office 3,253,792
Patented May 31, 1966

3,253,792
STATOR WINDING MACHINE AND TOOLING THEREFOR
William N. Brown and John J. Henry, Fort Wayne, Ind., assignors to Fort Wayne Tool & Die, Inc., Fort Wayne, Ind.
Filed Apr. 19, 1963, Ser. No. 274,125
5 Claims. (Cl. 242—1.1)

This invention relates generally to machines for winding coils into internally slotted dynamoelectric machine stator core members, and more particularly to tooling for use with such stator winding machines for forming the end turns of concentric coils.

Gun-type stator winding machines are well known in the art, conventionally comprising a winding head or gun having a wire dispensing needle on its outer surface, the head being moved reciprocally through the bore of the stator to be wound and also having limited rotational movement imparted thereto adjacent the ends of its stroke. Movement of the gun through the stator bore in one direction thus carries a wire therethrough to form one side of the coil with the rotational movement of the gun at the end of its stroke forming one end turn; the next axial motion on the gun in the opposite direction back through the bore forms the other side of the coil and finally the next rotational movement of the gun restores the wire dispensing needle to its original position forming the other end turn and thus completing one full turn of the coil being wound. Such a gun-type stator winding machine is described and illustrated in Patent No. 3,025,008 to Richard G. Nill and Robert J. Eminger and assigned to the assignee of the present application.

Shroud devices have commonly been employed for "tooling" such gun-type winding machines in order properly to form the end turns of the coils. Such shroud devices conventionally comprise a pair of shroud members respectively secured to the opposite end faces of the stator core member being wound and extending axially outwardly therefrom, each such shroud member having an enlarged bulb portion formed on the end thereof spaced from the end face of the stator core member and forming a radially outwardly facing slot therewith. With this arrangement, the wire dispensing needle on the winding gun moves axially outwardly from the bore of the stator core member carrying the wire past a side of the respective shroud member, the rotation of the gun adjacent the end of its stroke thus causing the wire to form a loop around the respective bulb portion; subsequent axial movement of the gun and the wire dispensing needle back through the stator bore thus pulls the wire loop along the outer surface of the bulb and into the shroud slot to form an end turn at the respective end face of the stator core member and to hold the thus formed end turns outwardly away from the bore of the core member.

It has been customary to employ gun-type stator winding machines tooled with such shroud devices for winding stator core members of the distributed winding type, i.e., comprising a plurality of pole groups of concentrically arranged coils, each coil of a given group having a different pitch.

In the winding of concentric coils of progressively greater pitch forming the pole groups of a distributed winding, it has in the past been necessary to employ a different width shroud member for winding each coil of different pitch. In order to eliminate the necessity for stopping the winding machine and changing the shroud members after the coils of one pitch have been wound and before winding the coils of the next higher pitch, shroud members of the type shown in the aforesaid Patent No. 3,025,008 have been provided; such shroud members incorporate an enlarged bulb portion having a width adjacent the respective end face of the stator core member corresponding generally to the pitch of the larger of the coils being wound, the bulb portion being mounted on a shank portion having a width less than the pitch of the smaller of the coils.

Such enlarged bulb shroud members have been satisfactorily employed for winding concentric coils where, as in the case of conventional four pole windings, the pitch or span of the largest coil of each pole group does not exceed something on the order of 90°; in such windings, the relatively narrow shank portion of the shroud device is sufficient to hold the end turns of even the largest coil outwardly away from the bore of the core member, and further the maximum transverse width of the bulb portions of the shroud is less than the inside diameter of the bore thus permitting the assembly of a one-part shroud device on the stator core member through the bore. However, in the case of windings in which the largest-pitched coil of each pole group has a substantial span, such as in conventional two-pole windings, the relatively narrow shank portion of the shroud does not adequately hold the end turns of the larger-pitched coils outwardly away from the bore and furthermore, the transverse width of the bulb portion may be such as to preclude assembly of a unitary shroud device through the bore.

For these reasons, in the winding of windings including a larger number of coils in each pole group, such as four or five, and particularly where the larger-pitched coils of each pole group have a substantial span, such as in two-pole windings, it has been customary to employ for tooling various hook devices in conjunction with throw-out devices on the winding gun for forming the end turns and holding the same outwardly away from the bore; the inertia of such throw-out devices has, however, severely limited the winding speed of the machine. Alternatively, tooling has been provided incorporating large inner or main shrouds and relatively thin segmental shrouds; the main shrouds form the end turns of the innermost coil while the segmental shrouds are respectively disposed on either side of the main shroud in alignment with the core teeth between the slots in which the larger pitched end turns are wound and forming the end turns of the larger coils. While such tooling employing main and segmental shrouds provides the requisite winding speeds, the loading of the relatively thin segmental shrouds onto the unwound stator core member and the subsequent unloading of the segmental shrouds from the fully wound core member is a difficult and time consuming operation, particularly in the case of core members having a two-pole winding with four or five coils per pole and a relatively small bore.

It is therefore desirable to provide tooling for use with a gun-type winding machine for winding concentric coils of progressively greater pitch into an internally slotted dynamoelectric machine stator core member, such tooling eliminating the necessity for loading segmental shrouds on the core member being wound, providing the requisite support for the end turns of the larger pitched coils, and eliminating the necessity for the use of throw-out devices on the winding gun or auxiliary hook devices for forming the end turns.

It is accordingly an object of the invention to provide improved tooling for use with a gun-type winding machine for winding at least two concentric coils of progressively greater pitch into an internally slotted dynamoelectric machine stator core member.

Another object of the invention is the provision of improved tooling for use with a gun-type winding machine particularly suited for winding two-pole windings.

Further objects and advantages of the invention will be described and illustrated in the following description and in the accompanying drawings, and the features of novelty which characterize this invention will be pointed out with particularity in the claims annexed to and forming a part of this specification.

The invention in its broader aspects provides tooling comprising a shroud member for each pole being wound and having means for mounting the same on the stator core member at the center of the respective pole, each shroud member having shank portions extending axially outwardly from the respective end faces of the core adjacent the bore. The shank portions respectively have a transverse width less than the span of the two core slots in which the smallest pitched coil of the respective pole group is wound and respectively have enlarged bulb portions formed at their axially outer ends for forming the end turns of the coils, the bulb portions being axially spaced from the respective end face of the core and forming radially outwardly facing slots for accommodating the end turns and holding the same outwardly away from the bore.

First and second groups of elongated winding finger members are provided respectively corresponding in number to the core teeth intermediate the core slots in which the coils are wound, each of the finger members having a first portion joined to a hook portion. First and second means are provided for respectively pivotally mounting the first portions of the respective groups of finger members for pivotal movement between first and second positions, the first and second means being adapted for relative axial movement between first positions respectively adjacent the opposite core end faces and second positions axially spaced therefrom. The finger members in the first positions of the first and second means are in their first positions with their first portions extending radially inwardly respectively in axial alignment with and engaging the intermediate core teeth at the respective end faces of the core and with their hook portions extending generally axially outwardly therefrom adjacent the bore. The bulb portions of the shroud members respectively extend axially outwardly farther than the hook portions of the respective finger member groups in the first positions of the first and second means so that the end turns of the larger pitched coils are caught by and wound over the hook portions.

The finger members are curved so that axial movement of the first and second means to their second positions causes the finger members to be cammed by engagement with the end turns to their second positions in which the first portions of the respective finger member groups extend generally axially toward the respective core member end faces and the hook portions extend radially inwardly toward the bore out of engagement with the end turns. With his arrangement, the mounting means and the finger members form a permanent part of the tooling for the machine, being adapted to be mounted thereon, and thus it is only necessary to load the main shroud members onto the stator core member; these main shroud members are relatively large and their loading onto the stator core member is neither difficult nor time consuming. The main shroud members thus cooperate to form the end turns of the coils while the hook portions of the finger members in the first positions of the mounting means hold the end turns outwardly away from the bore.

In the drawings:

FIG. 5 is a fragmentary cross-sectional view taken along the line 5—5 of FIG. 3;

FIG. 6 is a fragmentary cross-sectional view taken along the line 6—6 of FIG. 3;

FIG. 7 is a fragmentary view, partly in cross-section, illustrating the assembly of the tooling of the invention;

FIG. 8 is a gramentary top view further illustrating the assembly of the tooling of the invention;

FIG. 9 is a fragmentary developed top view useful in explaining the mode of operation of the tooling of the invention;

FIG. 10 is a fragmentary developed top view showing the five-coil winding wound with the tooling of the previous figures prior to removal of the stator core member from the winding machine, and FIG. 11 is a fragmentary view illustrating the removal of the tooling from the fully wound winding.

Figure 1:
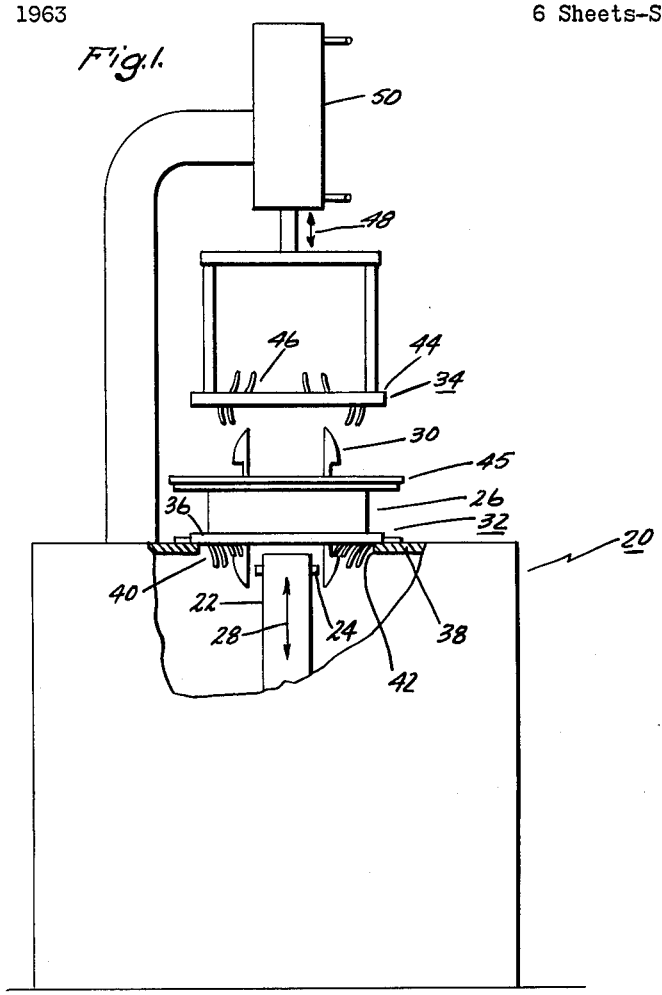
FIG. 1 is a side elevational view, partly broken away, illustrating a gun-type stator winding machine incorporating the improved tooling of the invention.

Referring now to FIG. 1 of the drawing, there is shown at 20 a gun-type stator winding machine provided with a conventional gun 22 having wire dispensing needles 24 thereon corresponding in number to the number of pole groups to be wound. Gun 22 is adapted to be moved reciprocably through the bore of the stator core member 26 to be wound, as shown by arrows 28, and to be oscillated at the ends of its stroke, as shown by arrows 29 (FIG. 3) by suitable mechanism (not shown), which may be of the type described and illustrated in the aforesaid Patent No. 3,025,008.

As will be hereinafter more fully described, the tooling for forming the concentric coils of the pole groups of the winding to be wound in the slots of stator core member 26 includes main shroud members 30 secured to the stator core member 26 and upper and lower roll-out finger assemblies 32, 34. The lower roll-out finger assembly 32 comprises a nest plate 36 adapted to be removably secured to and supported on a supporting surface or platen 38 of the winding machine, and a lower group of roll-out fingers 40 pivotally mounted on the nest plate 36, as will be hereinafter more fully described. It will be seen that the lower roll-out fingers 40 and the shroud members 30 project downwardly through opening 42 in platen 38. As will be hereinafter more fully described, the shroud members 30 are initially held in assembled relation on the core 26 by means of a pin-ring 45. The upper roll-out finger assembly comprises a clamp-ring 44 with an upper group of roll-out fingers 46 pivotally mounted thereon. The upper roll-out finger assembly 34 is mounted on the winding machine 20 for axial movement toward and away from the core 26 in the direction shown by the arrows 48 by means of a suitable hydraulic cylinder 50.

Figure 2:
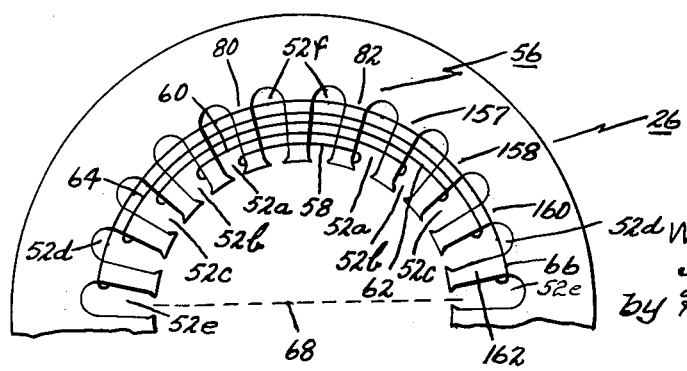
FIG. 2 is a fragmentary end view of a stator core member with a five-coil, two pole winding schematically shown thereon.

Referring now briefly to FIG. 2, there is shown a diametral half of a conventional stator core member 26, shown here as having twenty-four winding slots 52 (only half of which are here shown) extending generally radially outwardly from bore 54. One five-coil pole group 56 of a conventional two pole winding is schematically shown. Pole group 56 comprises the smallest pitched coil 58 with its sides extending through slots 52a and spanning two slots 52f, as shown, coil 60 having its sides extending through slots 52b, coil 62 having its sides extending through slots 52c, coil 64 having its sides extending through slots 52d, and the largest-pitched coil 66 having its sides extending through slots 52e. It will be readily seen that while no particular problem exists with respect to the end turns of the smallest-pitched coil 58 tending to extend across the bore 54, that at the other extreme, if some means are not provided for forming the end turns of the largest-pitched coil 66 into an arc and holding the same outwardly away from the bore 54, the end turns would normally form a chord across the bore as shown by the dashed line 68.

Referring now to FIGS. 3 through 8 of the drawing, each of the shroud members 30 (there being two employed for winding the two-pole winding here described)

comprises a shank portion 70 which extends through the bore 54 of the stator core member 26 and has portions 72, 74 extending axially outwardly from the opposite end faces 76, 78 thereof. Shank portion 70 has a transverse width less than the span of the smallest coil 58 to be wound, i.e., less than the transverse distance between teeth 80, 82 which bound the unused slots 52f (FIG. 2) at the bore 54, and is disposed between slots 52a, i.e., at the center of the pole formed by the respective pole group 56.

Conventional slot insulators 84 are positioned in the winding slots 52 and have cuff portions 86 extending axially outwardly beyond the end faces 76, 78, as shown. Each of the shroud members 30 is provided with a pair of mounting tongues 88, 90 which extend radially outwardly over end faces 76, 78 of core 26 and over the cuff portions 86, as shown. Each of the shroud members 30 has enlarged bulb portions 92, 94 formed on the axially outer ends of the shank extension portions 72, 74, bulb portions 92, 94 having flat surfaces 96, 98 axially spaced from tongues 88, 90 respectively, and defining radially outwardly facing slots 100, 102, respectively, which accommodate the end turns of the coils being wound and hold the same outwardly away from the bore 54.

Shroud members 30 are initially loaded on the unwound stator core member 26 prior to assembly in the winding machine 20, are retained in the requisite radial relationship by pins 104 which secure the upper tongues 88 to pin ring 45, and are held in proper position on the core 26 by means of a suitable plug 108 temporarily inserted in the bore (as best seen in FIG. 7).

Figure 4:
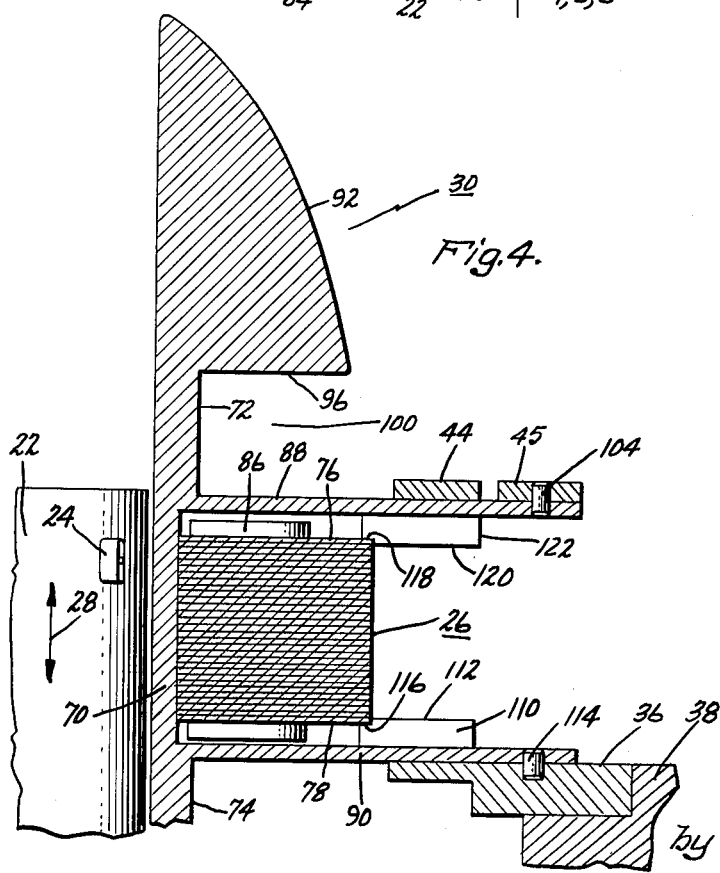
FIG. 4 is a fragmentary cross-sectional view along the line 4—4 of FIG. 3.

Disregarding momentarily the action of the roll-out finger members to be hereinafter described, the above described assembly of the unwound stator core member 26, the shroud members 30 secured to pin-ring 45 and plug 108, is assembled on the nest plate 36, the lower tongues 90 extending through radial slots 110 in nest plate portion 112 and being pinned to the nest plate 36 by means of pins 114, as best seen in FIG. 4. It will be seen that the outer peripheral edge of the bottom end face 78 of core 26 is seated in and supported by notch 116 in nest plate portion 112. When the core and shroud assembly 26, 30 is thus assembled on the nest plate 36, plug 108 is removed.

Figure 3:
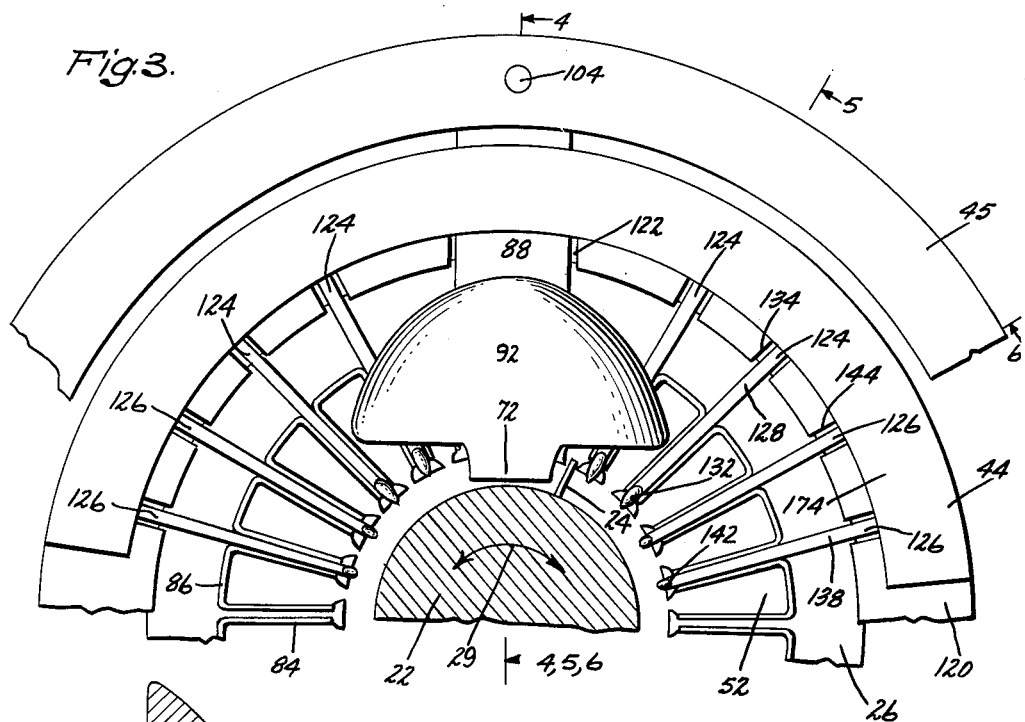
FIG. 3 is a fragmentary top view, partly in cross-section, illustrating the improved tooling of the invention for use in winding a five-coil, two pole winding into a twenty-four slot stator core member.

Again ignoring the action of the roll-out fingers 46 to be hereinafter described, the clamp ring 44 is lowered by the hydraulic cylinder 50 until the notch 118 in clamp ring portion 120 engages the outer peripheral edge of the upper end face 76 of core 26, suitable radially extending slots 122 in the clamp ring portion 120 accommodating the upper tongues 88, as best seen in FIGS. 3 and 4.

The upper group of roll-out fingers 46 comprise, in the illustrated embodiment, inner fingers 124 and outer fingers 126. The inner fingers 124 respectively include straight portions 128 pivotally connected at one end to clamp ring portion 120, as at 130, and joined at their other ends to hook portions 132. Suitable radial slots 134 formed in the clamp ring portion 120 permit the inner roll-out fingers 124 to be pivoted, as shown by the arrows 136, from their operative positions as shown in solid lines in FIG. 5, and in dashed lines in FIG. 11 to second positions as shown in solid lines in FIG. 11. The outer roll-out fingers 126 likewise comprise straight portions 138 pivotally connected at one end to clamp ring portion 120, as at 140, and joined at their other ends to hook portions 142. Suitable radial slots 144 formed in the clamp ring portion 120 permit the outer roll-out fingers 126 to be pivoted, as shown by arrow 146 from their operative positions as shown in FIG. 6 to second positions comparable to the second positions of the inner roll-out fingers 124, as shown in FIG. 11.

The lower group of roll-out fingers 44 on the nest plate 36 comprise complementary inner and outer roll-out fingers 124a and 126a respectively identical to the upper roll-out fingers 124, 126 and respectively pivotally connected to the nest plate portion 112 in the same manner as the connection of the upper roll-out fingers 124, 126 to the clamp ring portion 120.

It will be seen that the straight and hook portions 128, 132 of the inner roll-out fingers 124, 124a are joined by a curved inner surface 146 and that the outer surfaces are also curved as at 148. Likewise, the straight and hook portions 138, 142 of the outer roll-out fingers 126, 126a are joined by a curved inner surface 150 and a curved outer surface 152. A comparison of FIGS. 5 and 6 and inspection of FIG. 9 will readily reveal that the hook portions 142 of the outer roll-out fingers 126, 126a are axially longer than the hook portions 132 of the inner roll-out fingers 124, 124a. It will also be seen in FIG. 9 that the curved portions of both the inner and outer roll-out fingers 124, 124a and 126, 126a have their outer surfaces formed as a relatively thin edge and their nner surfaces transversely wider than their outer surfaces to define a somewhat "tear-drop" cross-sectional configuration.

The outer roll-out fingers 126, 126a are biased to their operative operations as shown in FIG. 6, by suitable leaf springs 154, whereas the inner roll-out fingers 124, 124a are normally retained in their second positions, as shown in solid lines in FIG. 11, by means of suitable detents 156, as best seen in FIG. 5. Detents 156 may comprise conventional spring-biased pins mounted in suitable openings in clamp ring 120 and nest plate 112, respectively.

Inspection of FIG. 3 will reveal that the radial slots 134, 144 in the clamp ring portion 120 and the nest plate portion 112, and the inner and outer roll-out fingers 124, 124a and 126, 126a respectively pivotally mounted therein are in radial alignment with the core teeth 157, 158, 160, and 162 which are respectively between the winding slots 52a, 52b, 52c, 52d, and 52e in which the coils forming pole group 56 are wound (FIG. 2).

Assuming now that the stator core member 26 with the main shroud members 30 assembled thereon has been seated upon the nest plate 36 and the clamp ring 44 in turn lowered to engage the stator core member, as above described, reference to FIGS. 3, 5 and 6 will reveal that the roll-out fingers 124, 124a and 126, 126a respectively have their straight portions 128, 138 extending radially inwardly toward the bore 54 with their hook portions 132, 142 respectively extending axially outwardly away from the end faces 76, 78 of the core 26 and adjacent the bore, the straight portions 128, 138 being in axial alignment with the respective core teeth 157, 158, 160, 162, and having their outer surfaces engaging the respective end faces 76, 78 of the core teeth between the cuff portions 86 of the slot insulators 84.

Referring now to FIGS. 9 and 10, with the clamp ring 44 and nest plate 36 clamping the stator core member 26 therebetween and with the roll-out fingers 124, 124a and 126, 126a thus in their operative positions, as above described, the winding machine 20 is operated so as to wind the coils forming the pole group 56 into the winding slots 52. Referring particularly to FIG. 9 in which the formation of an end turn of the largest-pitched coil 66 is shown (it being understood that the smaller-pitched coils are normally wound prior to winding of the largest-pitched coil), it will be seen that the wire dispensing needle 24 on the winding gun 22 moves axially through one outer winding slot 52e, carrying the wire 159 therethrough, in the direction shown by the arrow 161. When the needle reaches point 163 axially outwardly from finger members 126, the rotational movement of the gun is initiated causing the needle 24 to follow the path 164 until it is in alignment with the other outer winding slot 52e, as at 166. This motion of the winding gun 22 and wire dispensing needle 24 swing the wire 159 forming the end turn as shown in solid lines in FIG. 9 so that it is looped over the bulb portion 92 of the shroud member 30 and over the hook portions 142 of the outer roll-out fingers 126. The gun 22 and the wire dispensing needle 24 are then moved axially in the direction shown by the arrow 168 back through the other outer winding slot 52e with the final result that the end turn of the largest pitched coil 66 is formed into the requisite arcuate configuration and held outwardly away from the bore 54 of the stator core member 26 by the hook portions 132, 142 of the roll-out fingers 124, 126 as seen in FIG. 10.

When the winding operation has been completed, the clamp ring 44 may be raised axially away from the upper end face 76 of the core 26 by the hydraulic cylinder 50. Referring now particularly to FIG. 11 in which one of the upper roll-out finger members 124 is shown, it will be observed that the end turns 170 of the coils formed in the pole group 56, immediately after winding, engage the inner curved portion 146 of the roll-out finger 124 in its operative position, as shown in dashed lines, and it will be understood that the end turns 170 (FIG. 11) at both end faces 76, 78 of the core 26 similarly engage the inner curved surfaces 146, 150 of all of the roll-out fingers 124, 124a and 126, 126a. Thus, when the clamp ring 44 is moved axially upwardly in the direction shown by the arrow 172, the roll-out fingers 124, 126 are cammed by engagement of their inner curved surfaces 146, 150 with the end turns 170, as shown by the arrow 174 into their second positions in which their straight portions 128, 138 extend axially toward the core end faces 76, 78 and their hook portions 132, 142 extend radially inwardly toward the bore 54, but out of engagement with the end turns 170. When the clamp ring 44 is moved still further axially upwardly away from the core 26 by the hydraulic cylinder 50, leaf springs 154 will return the outer roll-out fingers 126 to their first or operative positions as shown in FIG. 6, however, the inner roll-out fingers 124 will be latched in their second positions as shown in solid lines in FIG. 11 by the detent devices 156.

With the clamp ring 44 raised as above described, the fully wound stator core member 26 with the shroud members 30 still loaded thereon may then be manually removed from the nest plate 36 and platen 38 of the winding machine 20 by lifting the same vertically away therefrom. Lifting the wound stator core member 26 vertically away from the nest plate 36 causes the lower roll-out fingers 124a, 126a to have exactly the same action as the upper roll-out fingers 124, 126 when the clamp ring 44 is raised, i.e., the lower roll-out fingers 124a, 126a will be cammed by engagement of their inner surfaces 146, 150 with the end turns 170 into their second positions out of engagement with the end turns 170, springs 154 returning the outer roll-out fingers 126a to their operative positions as shown in FIG. 6 and the detent devices 156 latching the inner roll-out fingers 126a in their second positions, as shown in FIG. 7.

Alternatively, the clamp ring 44 and stator core member 26 may be removably clamped together by suitable hook devices which extend past the outer periphery of the stator core and engage the lower end face 78, as shown in Patent No. 2,904,270 to Richard G. Nill and assigned to the assignee of this application. With this arrangement, clamp ring 44 and the wound stator core member 26 are lifted together axially away from nest plate 36 thus causing the above-described movement of the lower finger members 124a, 126a to their second positions. When the clamp ring and stator have thus been lifted from the nest plate, the hook devices are released and the stator core member manually lowered away from the clamp ring 44 thus causing movement of the upper finger members 124, 126 to their second positions. It will be readily understood that the winding machine and the above-described tooling therefor may be horizontally disposed rather than vertically as shown.

Referred now particularly to FIGS. 3, 7, and 8 in the illustrated embodiment in which the above-described tooling is provided for winding a two-pole twenty-four slot stator core member having five coils per pole group, the largest-pitched coil 66 having a span of 165°, it is desirable to employ an enlarged-bulb shroud of the type described and illustrated in the aforesaid Patent No. 3,025,008; the enlarged bulb shroud is required in order to pull out sufficient wire during rotation of the winding gun at the end of its stroke to provide the requisite arcuate configuration with the end turns, particularly of the larger-pitched coils, and also to insure that the end turns are caught by the hook portions 142 of the outer roll-out fingers 126, 126a. Thus, it will be seen that the inner ends 96, 98 of the bulb portions 92, 94 have a transverse width and thus a span greater than the span of the winding slots 52a, and thus when the roll-out fingers 124, 124a and 126, 126a are in their operative positions, it will be seen that the bulb portions 92, 94 respectively overlay the roll-out fingers 124, 124a. Recalling now that these roll-out fingers 124, 124a are mounted for pivotal movement inwardly, i.e., toward each other, and are restrained against pivotal movement in the opposite direction by portions 174 and 176 of the clamp ring 44 and nest plate 36, respectively, as best seen in FIGS. 5 and 6, it will be seen that if the roll-out fingers 124, 124a, were normally positioned in their operative positions, it would be impossible to assemble the unwound stator core member 26 and the shroud members 30 onto the nest plate 36 because the lower bulb portions 94 would interfere with the lower roll-out fingers 124a. Likewise, it would be impossible to lower the clamp ring 44 into its operative position engaging core 26 since the upper roll-out fingers 124 would interfere with the upper bulb portions 92.

It will now be recalled that when the clamp ring 44 is lifted away from the wound stator core member 26 and the stator core member is in turn lifted away from the nest plate 36, the inner roll-out fingers 124, 124a are cammed to their second positions, as shown in FIGS. 7, 8, and 11, and latched in those positions by the detent devices 156. Inspection of FIG. 8 will reveal that the inner roll-out fingers 124, 124a in their second positions are out of axial or interfering alignment with the bulb portions 92, 94.

Referring particularly to FIG. 7, by virtue of the fact that the inner roll-out fingers 124, 124a in their second positions are out of interfering alignment with the bulb portions 92, 94, this permits the unwound stator core member and shroud member assembly to be lowered, as shown by the arrow 178, with the lower bulb portion 94 passing between the lower roll-out fingers 124a, as seen in FIG. 8. It will be observed, however, that the curved hook portions 132 of the inner roll-out fingers 124a are still in axial alignment with the lower end face 78 of core 26. Thus, when the lower end face 78 engages the hook portions 132 of the lower roll-out fingers 124a, these fingers are cammed in the direction shown by the arrow 180 by engagement of their outer curved surfaces 148 with the lower end face 78, past the detent devices 156, into their operative positions, shown in FIG. 5. Likewise, downward movement of clamp ring 44, as above described, causes the upper roll-out fingers 124 to be similarly cammed to their operative positions by engagement of their outer curved surfaces 148 with the upper end face 76.

It will now be observed that there is provided in accordance with this invention tooling for use with a gun-type stator winding machine in which the end turns of the coils being wound are formed and held outwardly away from the bore, the only part of the tooling which is required to be assembled and removed from the stator core member itself being the main shroud members which are readily loaded on and unloaded from the core. It will particularly be observed that the portion of the tooling which replaces the segmental shrouds previously employed now forms a part of the winding machine thus eliminating the difficult and time consuming operation of loading and unloading the segmental shrouds and thus in turn substantially reducing the overall winding time. It will further be observed that the employment of main shroud members in conjunction with the roll-out fingers properly forms the end turns of the coils being wound and insures their being caught by the hook portions of the roll-out fingers thus eliminating the necessity for throw-out devices on the winding gun or auxiliary hook devices for catching the wire and forming the end turns, thus in turn permitting substantially higher winding speeds.

While there has been illustrated and described a specific embodiment of this invention, further modifications and improvements will occur to those skilled in the art and we desire therefore in the appended claims to cover all modifications which do not depart from the spirit and scope of this invention.

What is claimed is:

1. In a gun-type winding machine for winding at least two concentric coils of progressively greater pitch into an internally slotted dynamoelectric machine stator core member, said stator core member having flat opposite end faces with a bore extending therebetween and a plurality of winding slots extending outwardly from said bore and respectively defining teeth therebetween, the combination with said machine of tooling for forming the end turns of said coils and for holding the same away from said bore comprising: a shroud member adapted to be mounted on said core member and having a shank portion extending axially outwardly from one end face thereof adjacent said bore, said shank portion having a transverse width less than the spacing between the two core slots in which the smallest coil is wound, said shroud member having an enlarged bulb portion on said shank portion for forming the end turns of said coils, said bulb portion being axially spaced from said one core end face and forming a radially outwardly facing slot for accommodating said end turns and holding the same outwardly away from said bore; and means for holding the end turns of the larger pitched ones of said coils outwardly away from said bore comprising a mounting member adapted for relative axial movement between a first position adjacent said one core end face and radially outwardly from said core slots and a second position axially spaced from said one end face, and at least one pair of enlongated winding finger members respectively having a first portion pivotally mounted at one end on said mounting member for movement between first and second positions and having a hook portion joined to the other end of said first portion, said finger members being disposed on opposite sides of said shroud member, said finger members in said first position of said mounting member being in their first positions with said first portions extending radially inwardly respectively in axial alignment with and adjacent said core teeth between the core slots in which each of said coils is wound and with said hook portions extending generally axially outwardly from said one end face and adjacent said bore, said bulb portion extending axially outwardly farther than said hook portions in said first position of said mounting member whereby the end turns of said larger pitched coils are caught by and wound over said hook portions, said finger members respectively having curved inner surfaces joining said hook portions to said first portions whereby movement of said mounting member to said second positions thereof causes said finger members to be cammed by engagement with said end turns to said second positions thereof with said first portions extending generally axially toward said core member and said hook portions extending generally radially inward toward said bore but out of engagement with said end turns, the end of said bulb portion adjacent said one end face overlaying at least a part of the finger members respectively adjacent said shroud member in said first positions thereof, said adjacent finger members in said second positions thereof being out of interfering alignment with said bulb portion thereby permitting axial movement of said mounting member between said first and second positions thereof.

2. In a gun-type winding machine for winding at least two concentric coils of progressively greater pitch into an internally slotted dynamoelectric machine stator core member, said stator core member having flat opposite end faces with a bore extending therebetween and a plurality of winding slots extending outwardly from said bore and respectively defining teeth therebetween, the combination with said machine of tooling for forming the end turns of said coils and for holding the same away from said bore comprising: a shroud member adapted to be mounted on said core member and having a shank portion extending axially outwardly from one end face thereof adjacent said bore, said shank portion having a transverse width less than the spacing between the two core slots in which the smallest coil is wound, said shroud member having an enlarged bulb portion on said shank portion for forming the end turns of said coils, said bulb portion being axially spaced from said one core end face and forming a radially outwardly facing slot for accommodating said end turns and holding the same outwardly away from said bore; and means for holding the end turns of the larger pitched ones of said coils outwardly away from said bore comprising a mounting member adapted for relative axial movement between a first position adjacent said one core end face and radially outwardly from said core slots and a second position axially spaced from said one end face, and at least two pairs of elongated winding finger members respectively having a first portion pivotally mounted at one end on said mounting member for movement between first and second positions and having a hook portion joined to the other end of said first portion, said pairs of finger members being respectively disposed on opposite sides of said shroud member, said finger members in said first position of said mounting member being in their first positions with said first portions extending radially inwardly respectively in axial alignment with and adjacent said core teeth between the core slots in which each of said coils is wound and with said hook portions extending generally axially outwardly from said one end face and adjacent said bore, said bulb portion extending axially outwardly farther than said hook portions in said first position of said mounting member whereby the end turns of said larger pitched coils are caught by and wound over said hook portions, said finger members respectively having curved inner surfaces joining said hook portions to said first portions whereby movement of said mounting member to said second positions thereof causes said finger members to be cammed by engagement with said end turns to said second positions thereof with said first portions extending generally axially toward said core member and said hook portions extending generally radially inward toward said bore but out of engagement with said end turns, the hook portions of the finger members respectively adjacent said shroud member being axially shorter than the hook portions of the finger members remote from said shroud member, the end of said shroud member adjacent said one end face overlaying the first portions of said adjacent finger members in said first positions thereof, said remote finger members being out of interfering alignment with said shroud member, said adjacent finger members in said second positions thereof being out of interfering alignment with said bulb portion thereby permitting axial movement of said mounting member between said first and second positions thereof.

3. The combination of claim 2 wherein said hook portions of said adjacent finger members in said second positions thereof are in axial alignment with said one end face, said hook portions of said adjacent finger members having curved outer surfaces whereby said adjacent finger members are cammed by engagement of said outer curved surfaces with said one end face from said second positions to said first positions thereof responsive to axial movement of said mounting member from said second to said first position thereof, and further comprising spring means for biasing said remote finger members to said first positions thereof, and detent means for normally holding said adjacent finger member in said second positions thereof.

4. In combination with a dynamoelectric machine stator core member having flat opposite end faces with a bore extending therebetween and a plurality of winding slots extending outwardly from said bore and respectively defining teeth therebetween, tooling for use with a gun-type winding machine for winding into said winding slots two pole groups of coils forming a two-pole winding, each group having at least three concentric coils with their coil sides respectively positioned in adjacent winding slots, the largest-pitched coil of each pole spanning a substantial part of a diametral half of said core member, said tooling comprising: a shroud member for each pole having means for mounting the same on said core at the center of the respective pole, each shroud member having shank portions extending axially outwardly from the respective end faces of said core adjacent said bore, said shank portions respectively having a transverse width less than the span of the two core slots in which the smallest-pitched coil of the respective group is wound, said shank portions respectively having enlarged bulb portions formed at their axially outer ends for forming the end turns of said coils, said bulb portions being axially spaced from the respective end face and forming radially outwardly facing slots for accommodating said end turns and holding the same outwardly away from said bore; first and second groups of elongated winding finger members respectively corresponding in number to the core teeth intermediate the core slots in which said coils are wound, each of said finger members having a first portion joined to a hook portion; and first and second means for respectively pivotally mounting said first portions of the respective groups of finger members for pivotal movement between first and second positions, said first and second means being adapted for relative axial movement between first positions respectively adjacent said core end faces and second positions axially spaced therefrom, said finger members in said first positions of said first and second means being in their first positions with said first portions extending radially inwardly respectively in axial alignment with and engaging said intermediate core teeth at the respective end faces of said core and with said hook portions extending generally axially outwardly therefrom adjacent said bore, said bulb portions extending axially outwardly further than the hook portions of the respective finger member groups in said first position of said first and second means whereby the end turns of the larger pitched coils are caught by and wound over said hook portions, said finger members being curved whereby movement of said first and second means to said second positions thereof causes said finger members to be cammed by engagement with said end turns to said second positions thereof with said first portions of the respective finger member groups extending generally axially toward the respective core member end faces and said hook portions extending generally radially inwardly toward said bore but out of engageemnt with said end turns, the hook portions of the outer finger members which respectively engage the teeth between the core slots in which the largest and next-to-largest pitched coils are wound being axially longer than the hook portions of the inner finger members which respectively engage the teeth between the core slots in which the smallest and next-to-smallest pitched coils are wound, the ends of the bulb portions adjacent said core end faces respectively overlaying said inner finger members when said first and second means are in said first positions thereof, said inner finger members in said second positions thereof being out of interfering alignment with the respective bulb portion thereby permitting axial movement of said first and second means between said first and second positions thereof.

5. In combination with a dynamoelectric machine stator core member having flat opposite end faces with a bore extending therebetween and a plurality of winding slots extending outwardly from said bore and respectively defining teeth therebetween, tooling for use with a gun-type winding machine for winding into said winding slots two pole groups of coils forming a two-pole winding, each group having at least three concentric coils with their coil sides respectively positioned in adjacent winding slots, the largest-pitched coil of each pole spanning a substantial part of a diametral half of said core member, said tooling comprising: a shroud member for each pole having means for mounting the same on said core at the center of the respective pole, each shroud member having shank portions extending axially outwardly from the respective end faces of said core adjacent said bore, said shank portions respectively having a transverse width less than the span of the two core slots in which the smallest-pitched coil of the respective group is wound, said shank portions respectively having enlarged bulb portions formed at their axially outer ends for forming the end turns of said coils, said bulb portions being axially spaced from the respective end face and forming radially outwardly facing slots for accommodating said end turns and holding the same outwardly away from said bore; first and second groups of elongated winding finger members respectively corresponding in number to the core teeth intermediate the core slots in which said coils are wound, each of said finger members having a first portion joined to a hook portion; and first and second means for respectively pivotally mounting said first portions of the respective groups of finger members for pivotal movement between first and second positions, said first and second means being adapted for relative axial movement between first positions respectively adjacent said core end faces and second positions axially spaced therefrom, said finger members in said first positions of said first and second means being in their first positions with said first portions extending radially inwardly respectively in axial alignment with and engaging said intermediate core teeth at the respective end faces of said core and with said hook portions extending generally axially outwardly therefrom adjacent said bore, said bulb portions extending axially outwardly further than the hook portions of the respective finger member groups in said first position of said first and second means whereby the end turns of the larger pitched coils are caught by and wound over said hook portions, said finger members being curved whereby movement of said first and second means to said second positions thereof causes said finger members to be cammed by engagement with said end turns to said second positions thereof with said first portions of the respective finger member groups extending generally axially toward the respective core member end faces and said hook portions extending generally radially inwardly toward said bore but out of engagement with said end turns, the hook portions of the outer finger members which respectively engage the teeth between the core slots in which the largest and next-to-largest pitched coils are wound being axially longer than the hook portions of the inner finger members which respectively engage the teeth between the core slots in which the smallest and next-to-smallest pitched coils are wound, the ends of the bulb portions adjacent said core end faces being transversely wider than the respective shank portions and respectively overlaying said inner finger members when said first and second means are in said first positions thereof, said inner finger members in said second positions thereof being out of interfering alignment with the respective bulb portion thereby permitting axial movement of said first and second means between said first and second positions thereof, said hook portions of said inner finger members in said second positions thereof being in axial alignment with the respective end face and being cammed by engagement therewith into said first positions responsive to axial movement of said first and second means from said second to said first positions thereof, and further comprising means for normally retaining said outer finger members in said first positions thereof and said inner finger members in said second positions thereof.

References Cited by the Examiner

UNITED STATES PATENTS

| | | | |
|---|---|---|---|
| 2,967,672 | 1/1961 | Zwayer | 242—1.1 |
| 3,025,008 | 3/1962 | Nill et al. | 242—1.1 |
| 3,072,349 | 1/1963 | Busch et al. | 242—1.1 |

FOREIGN PATENTS

| | | |
|---|---|---|
| 862,555 | 3/1961 | Great Britain. |
| 871,011 | 6/1961 | Great Britain. |
| 347,570 | 8/1960 | Switzerland. |

OTHER REFERENCES

Erlanger, German App., 1,053,089, printed Mar. 19, 1959 (KL21d1–51).

MERVIN STEIN, *Primary Examiner.*

B. S. TAYLOR, *Assistant Examiner.*